May 31, 1960 T. E. GROUTAGE 2,939,022
ACCESS OPENINGS FOR ELECTRICAL MOTORS
Filed Aug. 22, 1957 2 Sheets-Sheet 1

United States Patent Office 2,939,022
Patented May 31, 1960

2,939,022

ACCESS OPENINGS FOR ELECTRICAL MOTORS

Thomas E. Groutage, Newton Mearns, Scotland, assignor to The Hoover Company, North Canton, Ohio, a corporation of Ohio Filed Aug. 22, 1957, Ser. No. 679,671

9 Claims. (Cl. 310—71)

The present invention relates to electrical outlets and more particularly to the arrangement of a cover plate for a housing enclosing an electrical apparatus which may or may not require an electrical connection extending to the outside of the housing. The arrangement is such that when no outside connection is needed, the cover plate for the access opening of the housing is placed in one position to completely close the access opening and when an external connection is required the cover plate is reversed in position to provide an opening of a size and shape to receive a conductor cord leading from the exterior of the housing to the interior. Thus in both cases the interior of the housing is completely closed to prevent access to the interior until the cover plate is removed.

Specifically according to the invention a semi-circular recess is formed in an edge of the housing which surrounds the access opening and a complemental trough or depression is formed in the cover plate. In the specific embodiments disclosed the trough or depression is formed by stamping the depression into one side of a sheet metal cover plate with the result that a corresponding ridge is formed on the other side of the cover plate. When the cover plate is placed in position to receive a conductor cord the recess in the edge of the housing and the complemental depression in the cover plate form an opening of a size to snugly receive a conductor cord and are of a size to clamp the conductor cord in position when the cover plate is in place. When no external connection is necessary the cover plate is reversed and the ridge closes the recess formed in the edge of the access opening and completely closes the interior of the housing from the outside.

The shape of the access opening and the shape of the cover plate is preferably made so as to be symmetrical or of the same shape and size on opposite sides of a median line passing through the centers of the recess and depression. Thus when the cover plate is reversed in position, its sides will still close the sides of the access opening.

In some cases it may be necessary to provide more than one conductor cord leading to the interior of an electrical housing, in which case two recesses may be formed in the edge wall of the access opening and two depressions and corresponding ridges formed in the cover plate. In that case the access opening and cover plate should be symmetrical or of the same shape and size on opposite sides of a median line lying midway between the two recesses and depressions.

The invention is particularly useful with electric motors having access openings on each side of the end frames at one or both ends of the motor, which may require an electrical lead into the motor from one or both sides of an end plate, into one side only of the end plate, or require no leads into the motor housing from a particular end plate.

According to the invention, each access opening is made of the same shape and size and each is provided with a semi-circular recess, as above described, in the wall forming its edge and each cover plate is formed with with a depression and ridge as above described.

Thus if only a single conductor cord is necessary one of the cover plates is put in place with its depression facing the recess in the edge wall of the access opening and the remainder of the cover plates are put in place with their ridges facing the recesses so as to close those recesses.

If more than one conductor cord is necessary, the cover plates at those access openings where cords are necessary will be assembled with their depressions facing the recesses and the remainder will be assembled in the reverse position. Thus each end frame may be a duplicate of the other and the cover plates may all be duplicates, there being two end frames and four cover plates.

Other objects and advantages of the present invention will become apparent as the description proceeds when taken in connection with the accompanying drawings in which.

Figure 1:
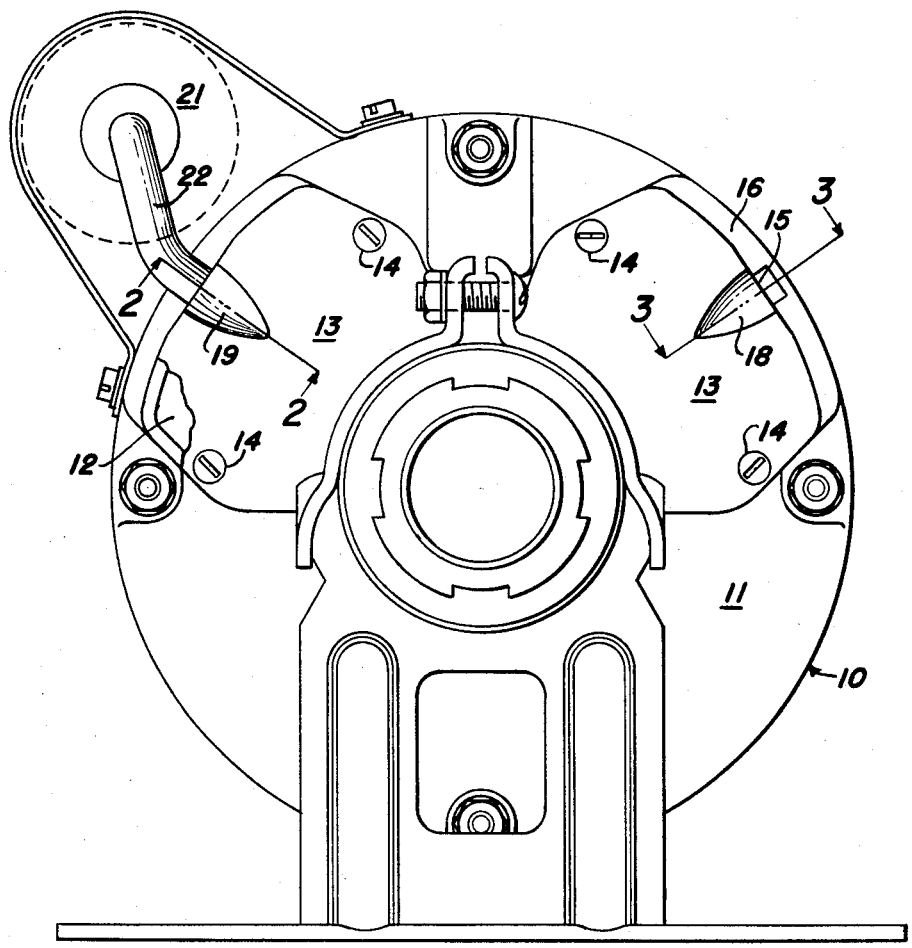
Fig. 1 is an end plan view of a motor with the invention applied thereto.

Referring to Figs. 1–4 of the drawings the reference numeral 10 represents a motor casing having end frames, one of which is shown at 11 and in which the rotor of the motor is rotatably mounted in any suitable manner.

Each end frame 11 is formed with access openings 12, one on either side of the vertical center line of casing 10 to provide for easy access to the interior of casing 10 for making any necessary electrical connections.

Each opening 12 is provided with a cover plate 13 held in position by screws 14 threaded into the end frames 11.

Semi-circular recesses 15 are formed in the edge wall 16 of openings 12 on lines 2—2 and 3—3 of Fig. 1, it being noted that these recesses 15 are formed mid-way of the width of openings 12, that the openings 12 are symmetrical on either side of lines 2—2 and 3—3 and that the openings for screws 14 are placed the same distance on either side of the lines 2—2 and 3—3. An undercut 17 is formed in edge wall 16 inside of each recess 15 for a purpose which will presently appear.

Each cover plate 13 is formed with a depression 18 on one side and a corresponding ridge 19 on the opposite side and with openings 20 for screws 14 equally spaced on opposite sides of the lines 2—2 and 3—3 of Fig. 1. The depressions 18 merge with one face of the plates 13 and the ridges 19 merge with the other face. The depressions 18 and ridges 19 are preferably formed by stamping in an obvious manner but may be formed in any other suitable manner such as by casting should the plates be formed in that manner.

In the motor shown in Fig. 1 a condenser 21 is shown mounted on the exterior of the casing 10, which requires an electrical connection to the windings on the interior of the casing 10. For that purpose a conductor cord 22 is provided leading from the condenser 21 to the interior windings and lying in the recess 15 on the left hand side.

In the motor shown the access opening 12 on the right hand side needs no external connection.

Figure 2:
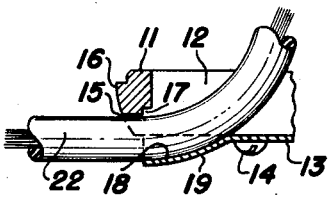
Fig. 2 is a fragmentary sectional view taken on line 2—2 of Fig. 1 and looking in the direction of the arrows.
Figure 3:
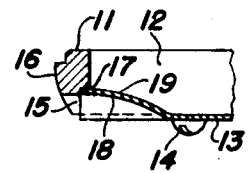
Fig. 3 is a fragmentary sectional view taken on line 3—3 of Fig. 1 and looking in the direction of the arrows.
Figure 4:
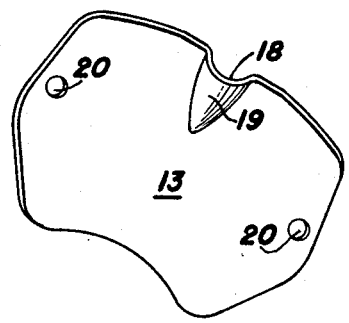
Fig. 4 is a perspective view of one of the cover plates of Fig. 1.

As shown in Fig. 1 the left hand opening 12 is closed by placing a cover plate 13 over the opening with the depression 18 facing the conductor 22 and the screws 14 applied. The recesses 15 and depressions 18 are preferably made of such a depth that the cord 22 will be clamped between the plate 13 and wall 16 as shown in Fig. 2. The right hand opening 12 is closed by placing a plate 13 over the opening with the ridge facing the recess 15 and the screws 14 applied. As shown in Figs. 1 and 3, the end of ridge 19 will enter undercut 17 inside of recess 15.

In the motor shown in Fig. 1, the main lead to the motor may enter the casing 10 from the opposite end.

Figure 5:
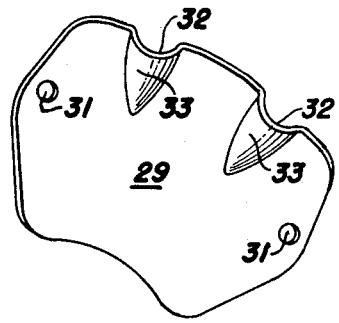
Fig. 5 is a perspective view of a modified form of cover plate.
Figure 6:
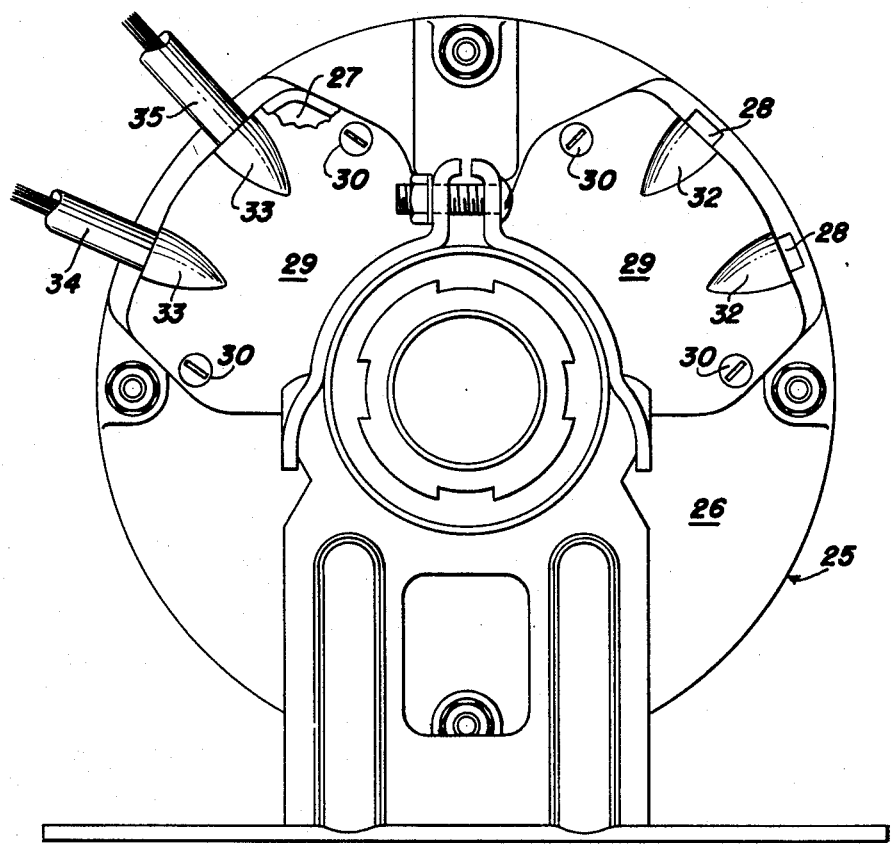
Fig. 6 is an end plan view of a motor with the cover plates of Fig. 5 in place.

Referring to Figs. 5 and 6, there is shown a motor having a housing 25, including duplicate end frames one of which is shown at 26. The end frames 26 are each formed with two access openings 27, one on either side of the vertical center line of casing 25. The edge walls forming the access openings 27 are formed with recesses 28 as in the first modification but in this case each access opening 27 is formed with two recesses 28, equally spaced from the radial center line of the openings 27.

The access openings 27 are adapted to be closed by cover plates 29 which are held to the end frames 26 by screws 30 passing through openings 31 in plates 29. Each plate 29 is formed with a depression 32 on one side and a corresponding ridge 33 on the other side.

It is to be noted that each opening 27 and each cover plate are symmetrical on opposite sides of the radial center lines of the openings 27.

The motor shown in Fig. 6 requires two external leads on the left hand side, represented by the cords 34 and 35. One lead may be for the main power line and the other may lead to a starting switch or to a condenser as in Fig. 1. No external leads are required on the right hand side.

As in the first modification the access openings 27 on the left may be closed by assembling a cover plate 29 over the opening with the depressions 32 facing the cords 34 and 35 and the screws 30 applied to clamp the cords in place. The right hand opening may be closed by assembling a cover plate 29 over the opening with the ridges 33 facing the recesses 28 and the screws 30 applied whereby the ends of the ridges 33 will enter the undercuts inside of the recesses 28 and completely close the right hand opening 27.

The present invention may be applied to any electrical device having an access opening which may or may not require an electrical connection to the exterior through the access opening. It is of particular use with motors having access openings in opposite end frames some of which may require external connections and some which do not require external connections. In that case the end frames may be duplicates and the cover plates duplicates, which results in a considerable savings in manufacturing costs.

From the foregoing it can be seen that the present invention provides a simple arrangement by which an access opening for an electrical device may be easily closed whether or not an external connection is required, by the use of the same cover plate in either case. In one case the cover plate is assembled over the opening with one face toward the opening and in the other case the cover plate is reversed with its other face facing the opening.

While I have shown and described but two embodiments of my invention it is to be understood that those embodiments are to be taken as illustrative only and not in a limiting sense. I do not wish to be limited to the specific structure shown and described but wish to include all equivalent variations thereof except as limited by the scope of the claims.

I claim:

1. In an electrical apparatus which may or may not require an external electrical connection thereto, a housing, an access opening formed in said housing, a conductor cord receiving recess formed in the wall of said housing surrounding said access opening, a cover plate for said access opening, a depression formed in one face of said cover plate complemental to said recess and coacting therewith to receive a conductor cord and dimensioned to clamp said cord between the walls forming said recess and depression when said cover plate is assembled over said access opening with said depression facing said recess and a ridge formed on the other face of said cover plate directly opposite to said depression dimensioned and positioned to close said recess when said cover plate is assembled over said access opening with said ridge facing said recess.

2. In an electrical apparatus according to claim 1 in which said cover plate is of the same shape and size as said access opening and both are shaped symmetrically on either side of a line intersecting said recess, depression and ridge.

3. In an electrical apparatus according to claim 1 including a cut out formed in the wall of said housing immediately inward of said recess positioned to receive the end of said ridge when said cover plate is assembled over said access opening with said ridge facing said recess.

4. In an electrical apparatus according to claim 1 in which said recess is formed in the outer face of the wall of said housing beyond said access opening, a cut-out is formed in the wall of said housing immediately inward of said recess and extending below the bottom thereof and said cover plate extends over said access opening to said recess whereby said ridge will enter said cut-out inwardly of said recess and said depression will form a continuation of said recess when said cover plate is assembled over said access opening with said ridge facing said recess.

5. In an electrical apparatus, a housing, a pair of access openings formed in said housing which may or may not require external electrical connections through said openings into said housing, a conductor cord receiving recess formed in the wall of said housing at each of said access openings, a cover plate for each of said access openings, a depression formed in one face of each of said cover plates complemental to said recesses and coacting therewith to receive a conductor cord and dimensioned to clamp said cord between the walls forming said recess and depression when said cover plates are assembled over said access openings with said depressions facing said recesses and a ridge formed on the other face of each of said cover plates directly opposite to said depressions dimensioned and positioned to close said recesses when said cover plates are assembled over said access openings with said ridges facing said recesses whereby one, both or neither of said cover plates may be assembled over said access openings so as to provide for the positioning of conductor cords between said recesses and depressions.

6. In an electrical apparatus according to claim 5 in which each of said access openings and each of said cover plates are of the same shape and size and are symmetrically shaped on either side of a line passing through said recesses, depressions and ridges whereby said cover plates may be interchangeably used to cover either of said access openings.

7. In an electric motor, a housing including at least one end frame, a pair of access openings formed in said end frame one on either side of the center line thereof, a conductor cord receiving recess formed in the wall of said end frame at the edge of each of said access openings on a radius of said end frame, a cover plate for each of said access openings, a depression formed in one face of each of said cover plates complemental to said recesses and coacting therewith to receive a conductor cord and dimensioned to clamp said cord between the walls forming said recess and depression when said cover plates are assembled over said access openings with said depressions facing said recesses and a ridge formed on the other face of each of said cover plates directly opposite to said depressions dimensioned and positioned to close said recesses when said cover plates are assembled over said access openings with said ridges facing said recesses, whereby one of said cover plates may be assembled over one of said access openings to provide for the positioning of a conductor cord between said one cover plate and the wall of said end frame and the other of said cover plates may be assembled over the other access opening so as to close the recess formed in the wall of said end frame at that access opening.

8. In an electric motor according to claim 7 in which each of said access openings and each of said cover plates are of the same shape and size and are symmetrically shaped on either side of the radii of said end frame on which said recesses are formed whereby said cover plates may be interchangeably used to cover either of said access openings.

9. In an electrical apparatus which may or may not require an external electrical connection thereto, a housing, an access opening formed in said housing, a conductor cord receiving recess formed in the wall of said housing at an edge of said access opening, a cover plate for said access opening, a depression formed in one face of said cover plate complemental to said recess and coacting therewith to receive a conductor cord, the walls forming said recess and depression being in overlapping relationship when said cover plate is assembled over said access opening with said depression facing said recess so as to clamp said cord between them, and a ridge formed on the other face of said cover plate directly opposite to said depression dimensioned to close said recess when said cover plate is assembled over said access opening with said ridge facing said recess.

References Cited in the file of this patent
UNITED STATES PATENTS

| | | |
|---|---|---|
| 648,529 | Robinson | May 1, 1900 |
| 1,509,737 | McCleary | Sept. 23, 1924 |
| 2,003,031 | Baker | May 28, 1935 |
| 2,078,840 | Dorl et al. | Apr. 27, 1937 |
| 2,701,318 | Feiertag | Feb. 1, 1955 |